United States Patent Office 3,153,287
Patented Oct. 20, 1964

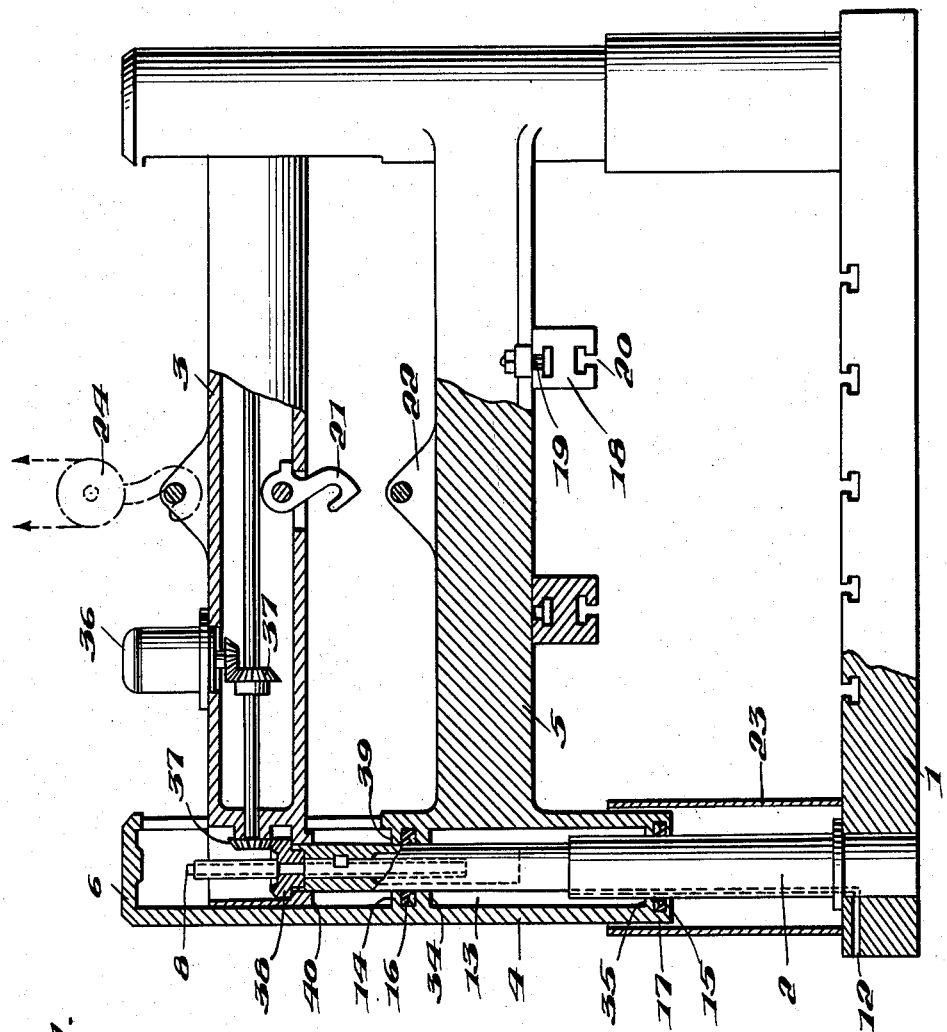

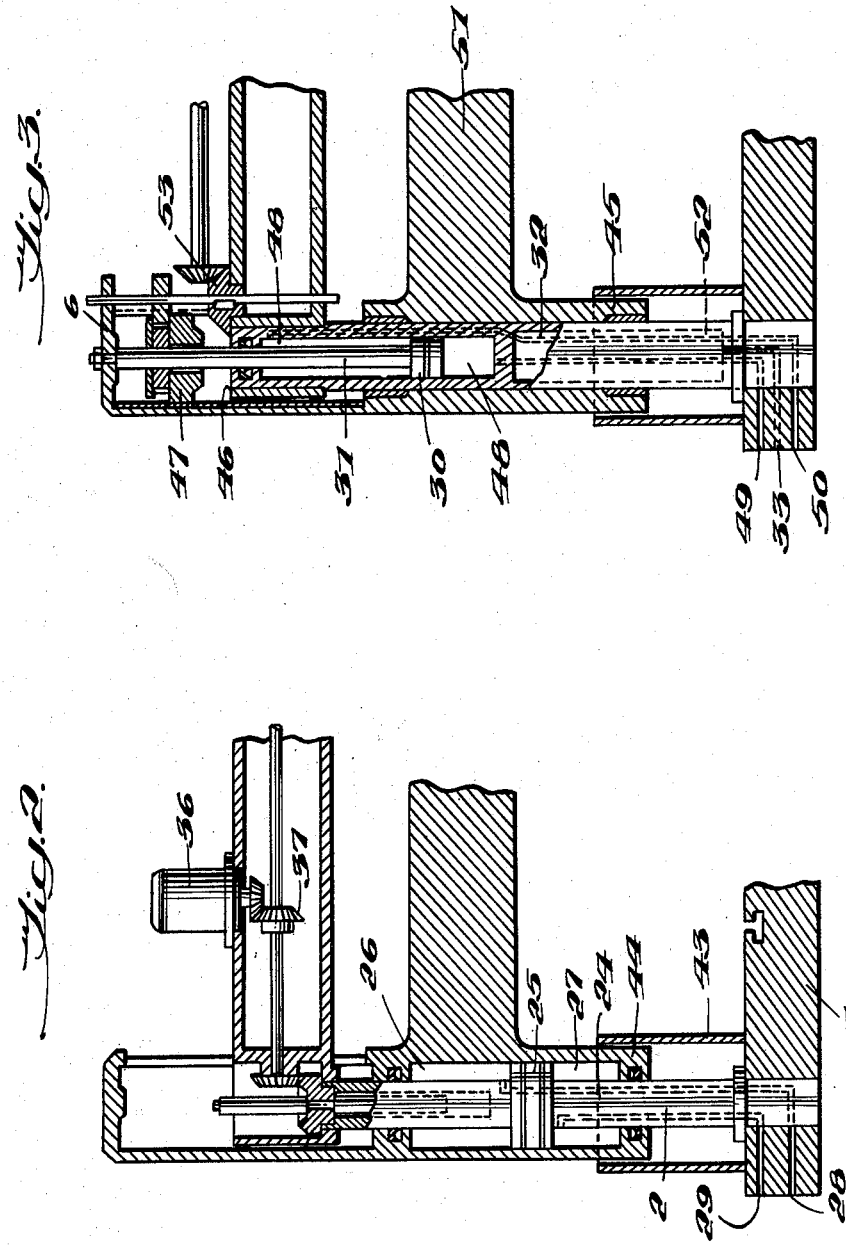

3,153,287
GAUGING APPARATUS
Eberhard Haas, Heilbronn (Neckar), Germany, assignor to August Lapple G.m.b.H. & Co., Heilbronn (Neckar), Germany, a company
Filed Jan. 20, 1960, Ser. No. 3,540
Claims priority, application Germany, Dec. 1, 1959, L 34,829
14 Claims. (Cl. 33—174)

The present invention relates to a testing or gauging apparatus, especially for the production of large tools, by means of which models or patterns may be fitted or gauged into or upon workpieces to determine whether or not these workpieces have to be refinished to comply with the required dimensions.

Such testing or gauging, that is, the fitting of the model into or upon the workpiece, and the finishing thereof, for example, by grinding, filing, scraping, and the like of two corresponding surfaces is carried out, for example, in the production and finishing of stamps and bottom dies as are required, for example, for molding the sheet metal plates or the like which are used for the manufacture of part of automobile bodies.

Prior to this invention it was customary first to finish only one member of such dies, then to fit the convex part into the concave part, and finally to finish the second member of the die. Since such an operation required a considerable length of time, so-called gauging models of plaster of Paris, plastic, or the like are now being used for gauging and finishing the two die members independently of and simultaneously with each other. In order to check the accuracy to size of a workpiece and to permit it to be finished insofar as may be required, these auxiliary or gauging models are usually applied by hand or by a hoist upon the workpiece after the same has been produced, for example, by a duplicating or profiling method. However, since with this method of gauging the models cannot always be applied in exactly the same position upon the workpiece, the indications and measurements attained will be inaccurate, which is bound to result in other inaccuracies in the workpiece when the same is finished accordingly. Other devices or presses which are known for applying the gauging models have the disadvantage that because of the considerable weight of the particular device or the heavy pressure applied thereby, the models will be easily distorted.

It is an object of the present invention to provide a testing or gauging apparatus which will overcome all of the above-mentioned disadvantages.

The gauging apparatus according to the present invention consists of a model supporting element which is securely and accurately guided, preferably by a plurality of bearing means, and provided with means which are adjustable within a horizontal plane for securing the models on this supporting element, and of a driving mechanism for adjusting the model supporting element within a vertical plane. The new apparatus has the advantage that it permits the models or patterns always to be placed in exactly the same position upon the workpiece to be finished, and that it also permits the position of the model relative to the workpiece to be easily readjusted at any time. Since the models are firmly secured while being fitted upon or into the workpiece and since they may be applied upon the latter at a pressure which may be accurately predetermined, the danger is also completely avoided that the force which is exerted upon the models during the gauging operation may be too great so that they may be deformed. The new apparatus is also designed so that the place of work will be easily accessible from all sides and the guiding elements will be protected from dust and chips. Although it may be easily transported, the apparatus is built so robust that it will always be possible to carry out the desired operations at the greatest accuracy. Furthermore, it may be provided with very simple locking means for securing the model supporting element in its inoperative position so as to avoid any danger to the operator while mounting the models and the workpieces.

These and other objects, features, and advantages of the present invention will become further apparent from the following detailed description thereof, particularly when the same is read with reference to the accompanying drawings, in which—

FIGURE 1 shows a side view, partly in cross section of an apparatus according to the invention;

FIGURE 2 shows a similar view of one side of a modification of the apparatus according to the invention; while FIGURE 3 shows a similar view of one side of a further modification of the apparatus according to the invention.

The gauging apparatus according to the invention is intended primarily for the construction of large tools such as dies and the like and for fitting gauging patterns or models upon or into workpieces so as to check the same for accuracy to size and shape.

The apparatus according to FIGURE 1 comprises a base plate 1 on which a pair of vertical cylindrical columns 2 are mounted in a spaced relation to each other. Each of these columns 2 forms a guide member on which a tubular member 4 is slidable in a vertical direction and coaxially to column 2. The two tubular members 4 are integrally connected to each other by a horizontal beam 5 or the like which forms a model support, and both tubular members 4 together with supporting beam 5 may be raised and lowered on guide columns 2 by hydraulic or pneumatic power in the same manner and by the means subsequently described.

Supporting beam 5 carries clamping bars 18 or the like on which the gauging models are to be secured. These clamping bars are secured to beam 5 by clamping bolts 19 and may be adjusted by these bolts to various positions in the longitudinal direction of the beam as well as in a direction transverse thereto and also to different intermediate angular positions. By means of T slots 20 in clamping bars 18 it is possible to secure any desired kinds of gauging models to supporting beam 5.

The driving means for adjusting the model supporting beam 5 within a vertical plane may, as already stated, be operated, for example, pneumatically or hydraulically. Thus, in the embodiment according to FIGURE 1, the adjusting movement of beam 5 is produced by a hydraulic drive. Each guide column 2 and the tubular member 4 thereon enclose an annular cylindrical chamber 13 into which the hydraulic pressure medium is inserted through suitable conduits 12 passing through column 2 and terminating in chamber 13. The upper end surface 34 of the annular chamber 13 is larger than the lower end surface 35 since guide column 2 has two different diameters at the points where it passes through the upper and lower end surfaces 34 and 35. Thus, as soon as the hydraulic pressure medium is conducted into the annular chamber 13, the tubular member 4 will be moved upwardly along guide column 2. Each tubular member 4 is mounted by means of two slide bearings 14 and 15 in spaced relation to each other on guide column 2, and is further provided with packings 16 and 17 which seal the annular chamber 13 toward the outside. Bearings 14 and 15 are spaced at a considerable distance from each other and thus insure that the two tubular members 4 will always remain parallel to each other and that the supporting beam 5 will at any elevation extend horizontally and parallel to base plate 1.

In order to protect each guide column 2 and the tubular member 4 thereon from being damaged by impacts of tools, workpieces, or other elements, and also from being soiled by dust and chips, their lower parts are surrounded by a rigid tubular member 23 which is mounted on base plate 1.

Guide columns 2 are rigidly connected to each other at their upper ends by a horizontal crossbeam 3 which, according to the preferred embodiment as shown in the drawings, may be of a tubular shape. Crossbeam 3 carries a pivotable hook 21 which may be engaged with an eye member 22 on the model supporting beam 5 to lock the latter in the raised inoperative position. Crossbeam 3 is further provided at its longitudinal center with an eye member 41 into which the hook of a crane 42 or the like may engage to transport the entire machine.

The reduced upper part of each guide column 2 is provided with an adjustable stop member 8, the upper end of which is adapted to engage with the lower surface of a cover 6 on the upper end of the tubular member 4 to limit the movement of member 4 and supporting beam 5 in the downward direction toward a workpiece which is mounted on base plate 1. Each stop member 8 consists of a threaded spindle which is inserted into a central vertical bore in column 2. In order to adjust stop member 8 and thus the extent of the downward stroke of the tubular member 4 and supporting beam 5 thereon from the upper end position which is determined by the engagement of a stop surface 39 on member 4 with a stationary stop surface 40 on crossbeam 3, a bevel gear 38 forming a nut is threaded on spindle 8 and rotatably mounted on the upper end of column 2. Bevel gear 38 may be driven in either direction through bevel gears 37 by a reversible motor 36 which is mounted on crossbeam 3. Since the same shaft which is driven by motor 36 not only drives the bevel gear 38 on spindle 8 at the left side of the machine, as shown in FIGURE 1, but also drives a similar bevel gear on a similar spindle at the right side of the machine, both spindles 8 will be adjusted equally and simultaneously, so that the extent of the strokes of both tubular members 4 will likewise be exactly equal. Furthermore, since by a common control mechanism, not shown, the hydraulic pressure medium will be equally and simultaneously supplied to cylinders 13 at both sides of the machine, the strokes of both tubular members 4 will also be exactly equal and simultaneous so that no jarring of beam 5 supporting the gauging models will occur during its upward and downward strokes.

The modification of the invention as illustrated in FIGURE 2 only differs from the embodiment according to FIGURE 1 insofar as each vertical guide column 24 carries a stationary piston 25 which is disposed within an annular cylinder formed in the tubular member 44, the lower part of which is surrounded by a stationary tubular member 43. Piston 25 divides the cylinder into two annular chambers 26 and 27 into which a hydraulic pressure medium is selectively or alternately supplied through conduits 28 and 29, respectively which extend through column 24 and are connected to a suitable control mechanism, not shown. Thus, depending upon whether the model supporting bar 5 is to be raised or lowered, the pressure medium is supplied either into chamber 26 or chamber 27.

In the further modification of the invention, as illustrated in FIGURE 3, each guide column 52 contains a cylindrical chamber 48 in which a piston 30 which is secured to a rod 31 or the like is adapted to slide upwardly and downwardly. Rod 31 or the like is secured at its upper end to the upper extension of tubular member 45 which, in turn, is integrally secured to the model supporting beam 51. A hydraulic pressure medium may be selectively or alternately supplied through conduits 49 and 50 into the upper or lower parts of cylinder 48 so as to act upon one side or the other of piston 30 to raise or lower the same and thus also raise or lower the tubular member 45 and the supporting beam 51.

Guide column 52 further contains a second chamber 32 which forms a pressure reservoir and may be selectively connected by suitable control means, not shown, either to conduit 49 or conduit 50. By means of the pressure supplied through conduit 49 or conduit 50 to which the boosting pressure from chamber 32 is added, it is possible to effect a very quick start and reversal of the movement of piston 30 and thus also of the tubular members 45 and the model supporting bar 51. The downward stroke of tubular member 45 is limited by the engagement of the upper end 46 of column 52 with a disk 47 which is provided with outer screw threads engaging with corresponding screw threads on the inner wall of the upper part of the tubular member 45. Disk 47 and thus the length of the downward stroke of tubular member 45 may be adjusted by a reversible motor, not shown, which, through a system of gears 53, is adapted to turn disk 47 and thereby to screw the same upwardly or downwardly within tubular member 45.

Before lowering the gauging model or pattern on supporting bar 51 upon the workpiece to be checked, the total weight of the model and of the supporting bar and its associated elements is partly or entirely compensated hydraulically so that only the weight required for carrying out the necessary work wil become effective. Such a weight compensation especially protects light gauging models from being damaged.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A gauging apparatus, particularly for the construction of large tools, for fitting gauging models and patterns upon or into workpieces to determine whether they are true to size, comprising solid upright guide means, a model supporting member, means for mounting said supporting member on said guide means so as to be slidable in a vertical direction along said guide means, holding means rigidly mounted on said supporting member for securing at least one gauging model thereon, said last means being adjustable in a horizontal plane, and driving means for raising and lowering said supporting member with respect to the guide means, a base plate, said guide means comprising a pair only of upright cylindrical guide columns rigidly mounted on said base plate in spaced relation to each other, said model supporting member comprising a single horizontal beam, said mounting means of said supporting member comprising a tubular member rigidly secured to said supporting member at each end thereof and at least two slide bearings on each of said tubular members disposed in vertically spaced relation to each other on each of said guide columns and slidable along such column in a vertical direction to guide said model supporting member so as to extend horizontally at any elevation to which it is adjusted, both of said columns extending upwardly from said base plate, each of said tubular members on said model supporting member telescoping over and being adapted to slide along one of said columns and extending coaxially thereto, said driving means comprising a source of a fluid pressure medium, and means for controlling the flow of said medium so as to act upon said tubular members in both directions to move the same positively along said guide columns.

2. A gauging apparatus as defined in claim 1, in which said model securing means consist of at least one clamping bar and means for adjusting said clamping bar in a horizontal plane in the longitudinal direction of said supporting member and along the same and also in various directions at different angles to said longitudinal direction.

3. A gauging apparatus as defined in claim 1, further comprising a chamber within said column forming a pressure reservoir and connected to said source of pressure, said control means being also adapted to connect said chamber to said apparatus to boost the pressure normally supplied to said apparatus from said source.

4. A gauging apparatus as defined in claim 1, in which said driving means comprises a cylinder within each of said tubular members on said guide column, and means for conducting the flow of said medium into each of said cylinders to act upon the upper end thereof to lift said tubular members together with said supporting beam along said guide columns.

5. A gauging apparatus as defined in claim 4, in which said conducting means comprise conduits extending through said columns and terminating in said cylinder within each of said tubular members.

6. A gauging apparatus as defined in claim 1, further comprising a tubular member surrounding the exposed part of each column and the lower part of each tubular member for protecting said parts.

7. A gauging apparatus as defined in claim 1, further comprising associated means on said guide columns and on said tubular members for limiting the extent of the movement of said tubular members in both directions, at least one of said means being adjustable.

8. A gauging apparatus as defined in claim 7, in which said adjustable means comprise a threaded spindle within and partly extending from the upper end of each of said columns, a nut on said spindle and rotatably mounted on said column, and means for turning said screws on both of said columns to screw both of said spindles simultaneously outwardly of said columns or into said columns, respectively, and stop members on the upper ends of said tubular members adapted to engage with the upper ends of said spindles to determine the extent of the downward strokes of said tubular members and said model supporting bar thereon.

9. A gauging apparatus as defined in claim 8, in which said means for turning said nuts comprise gear teeth on said nuts, a gear engaging with said gear teeth on each of said nuts, and a motor for turning both of said gears simultaneously.

10. A gauging apparatus as defined in claim 9, further comprising a crossbar rigidly connecting the upper ends of said columns, said motor and said gears being mounted on said crossbar, and associated locking means on said crossbar and on said supporting bar adapted to interengage with each other for securing said supporting bar in a raised inoperative position.

11. A gauging apparatus as defined in claim 10, further comprising means on said crossbar for connecting the same to a crane or the like for transporting said entire apparatus.

12. A gauging apparatus as defined in claim 1, in which said driving means comprise a cylinder within each of said guide columns, a piston within each of said cylinders, a piston rod extending from said cylinder and connecting said piston to said tubular member at the upper end thereof, a source of a fluid pressure medium, and means for controlling the flow of said medium and for conducting the same selectively to the upper and lower sides of both of said cylinders so as to act upon the opposite sides of said pistons for lifting and lowering said tubular members together with said supporting beam along said guide columns.

13. A gauging apparatus as defined in claim 12, further comprising associated means on said guide columns and on said tubular members for limiting the extent of the movement of said tubular members in both directions, at least one of said means being adjustable and comprising inner screw threads within the upper end of each of said tubular members, a screw member screwed into the threaded upper end of said tubular member above said column and adapted to engage with the upper end of said column to limit the extent of the downward stroke of said tubular member and said supporting bar, said screw member also having gear teeth thereon, gears engaging with said gear teeth on the screw members within both of said tubular members, and a motor for rotating both of said gears to adjust both of said screw members simultaneously.

14. A gauging apparatus as defined in claim 1 in which said driving means further comprises hydraulic lifting means within said tubular members connected to said source and said slide bearings are located on opposite sides of the hydraulic lifting means.

References Cited in the file of this patent
UNITED STATES PATENTS

| | | |
|---|---|---|
| 2,156,424 | Barnard | May 2, 1939 |
| 2,235,246 | Anthony | Mar. 18, 1941 |
| 2,521,216 | Hauk | Sept. 5, 1950 |
| 2,908,401 | Schroeder | Oct. 13, 1959 |
| 3,046,669 | Lasko | July 31, 1962 |